United States Patent
Seki

(10) Patent No.: US 8,881,098 B2
(45) Date of Patent: Nov. 4, 2014

(54) IMAGE PROCESSING APPARATUS, IMAGE PROCESSING METHOD, AND NON-TRANSITORY COMPUTER-READABLE STORAGE MEDIUM

(75) Inventor: Noriaki Seki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 694 days.

(21) Appl. No.: 13/186,098

(22) Filed: Jul. 19, 2011

(65) Prior Publication Data

US 2012/0180023 A1 Jul. 12, 2012

(30) Foreign Application Priority Data

Jan. 7, 2011 (JP) ................................ 2011-002200

(51) Int. Cl.
*G06F 9/44* (2006.01)

(52) U.S. Cl.
CPC ...................................... *G06F 8/30* (2013.01)
USPC ............ 717/106; 717/104; 717/108; 717/109

(58) Field of Classification Search
CPC ....... G06F 9/4428; G06F 8/24; G06F 9/4435; G06F 8/315; G06F 8/70; G06F 9/443; G06F 9/465; G06F 8/20
See application file for complete search history.

(56) References Cited

U.S. PATENT DOCUMENTS

| 6,763,515 | B1 * | 7/2004 | Vazquez et al. ............... | 717/109 |
|---|---|---|---|---|
| 8,761,450 | B2 * | 6/2014 | Hill et al. ....................... | 717/104 |
| 2002/0095654 | A1 * | 7/2002 | Fukase et al. ................. | 717/108 |
| 2005/0036170 | A1 * | 2/2005 | Okuoka et al. ................ | 717/106 |
| 2005/0060695 | A1 * | 3/2005 | Hostetter et al. .............. | 717/153 |
| 2005/0190994 | A1 * | 9/2005 | Yamanaka ..................... | 382/305 |
| 2006/0070084 | A1 * | 3/2006 | Novik et al. ................... | 719/318 |
| 2007/0074183 | A1 * | 3/2007 | Sigmund ....................... | 717/106 |
| 2007/0150877 | A1 * | 6/2007 | Emmett et al. ................ | 717/104 |
| 2007/0220484 | A1 * | 9/2007 | Takahashi et al. ............. | 717/109 |
| 2008/0092130 | A1 * | 4/2008 | Maeda ........................... | 717/168 |
| 2009/0249369 | A1 | 10/2009 | Itoh et al. | |
| 2010/0077379 | A1 * | 3/2010 | Sugishita ....................... | 717/106 |

FOREIGN PATENT DOCUMENTS

JP 2005-80018 A 3/2005

OTHER PUBLICATIONS

Lisa Gottesfeld Brown; A Survey of Image Registration Techniquess, 1992 ACM; pp. 325-376; <http://dl.acm.org/citation.cfm?id=146374>.*

Ernest L. Hall et al.; Computer image processing and recognition; 1980 SPIE; 10 pages; <http://proceedings.spiedigitallibrary.org/proceeding.aspx?articleid=1229732>.*

(Continued)

*Primary Examiner* — Thuy Dao
*Assistant Examiner* — Cuong V Luu
(74) *Attorney, Agent, or Firm* — Sughrue Mion, PLLC

(57) ABSTRACT

An image processing apparatus includes plural module creating units, plural wrapper creating units, an extracting unit, a calling unit, and an argument processing unit. The module creating units create processing modules that are obtained by instantiating different types of image processing classes by using functions. The wrapper creating units create wrappers that call the module creating units and that pass arguments specified in a pointer form to the module creating units. The extracting unit extracts, from image processing information, class names of the image processing classes corresponding to the individual processing modules and the arguments unique to the image processing classes. The calling unit converts the extracted class names and calls the wrapper creating units to which the converted class names are given. The argument processing unit stores the extracted arguments in an array, specifies an initial address of the array, and passes the initial address to the created wrappers.

12 Claims, 12 Drawing Sheets

(56) References Cited

OTHER PUBLICATIONS

Peter M. Athanas et al.; Real-Time Image Processing on a Custom computing platform; 1995 IEEE; pp. 16-24; <http://ieeexplore.ieee.org/stamp/stamp.jsp?tp=&arnumber=347995>.*

J. Barroso et al.; Number plate reading using computer vision; 1997 IEEE; pp. 761-766; <http://ieeexplore.ieee.org/stamp/stamp.jsp?tp=&arnumber=648635>.*

Duncan A. Rowland et al.; Manipulating Facial Appearance through Shape and Color; 1995 IEEE; pp. 70-76; <http://ieeexplore.ieee.org/stamp/stamp.jsp?tp=&arnumber=403830>.*

Joshua Leven et al.; Interactive Visualization of Unstructured Grids Using Hierarchical 3D Textures; 2002 IEEE; pp. 37-44; <http://dl.acm.org/citation.cfm?id=584110.584117&coll=DL&dl=GUIDE&CFID=518830843&CFTOKEN=25405113>.*

* cited by examiner

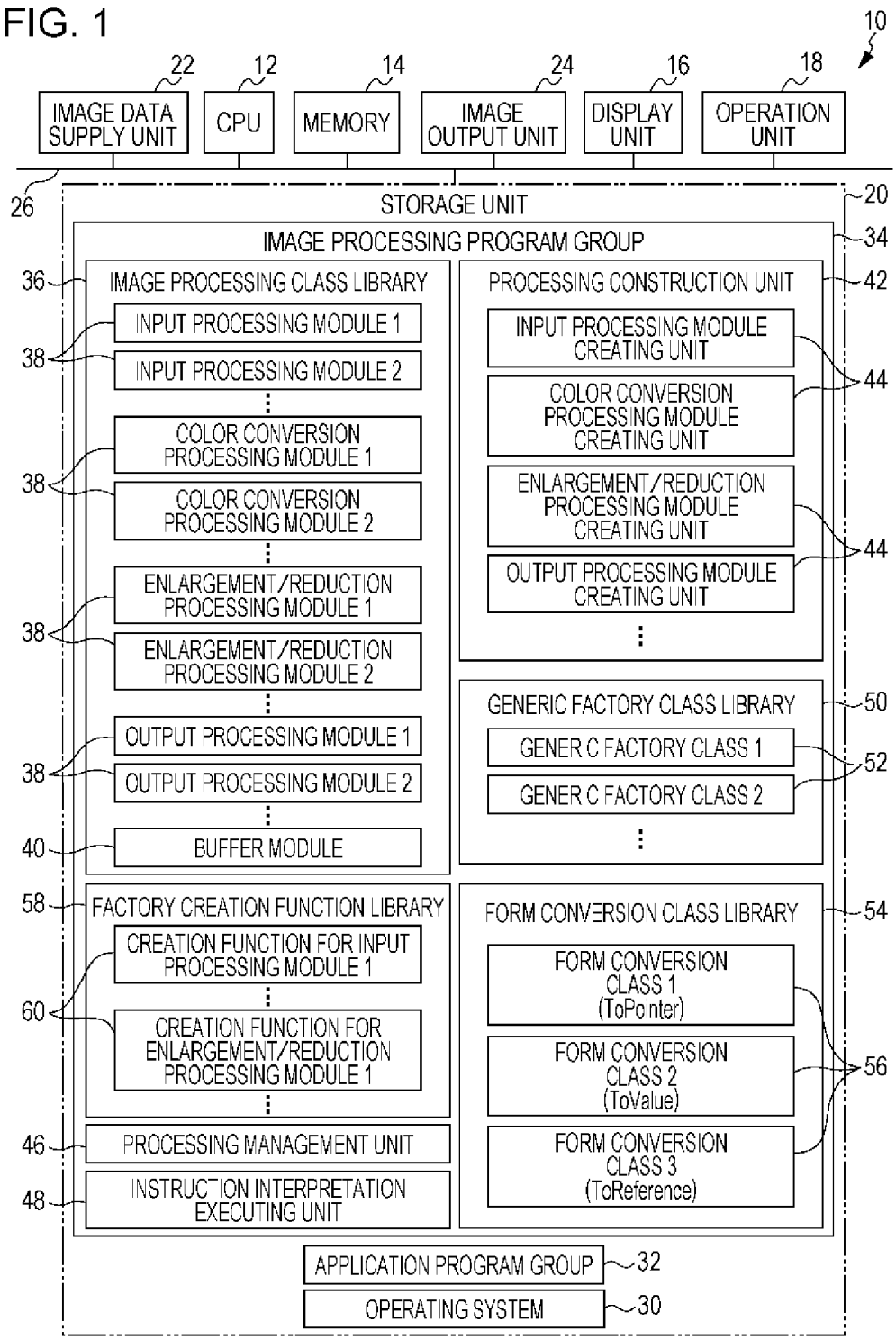

FIG. 6

| VARIABLE NAME | TYPE NAME | NUMBER OF ARGUMENTS | ARGUMENT |
|---|---|---|---|
| inFile | String | 1 | /foo/bar/in.png |
| inStrm | FileInputStream | 1 | inFile |
| read | ReadPNG | 1 | inStrm |
| ratio | Float | 1 | 1.5 |
| scale | Scale | 3 | read  ratio  ratio |
| outFile | String | 1 | /tmp/out.jpg |
| outStrm | FileOutputStream | 1 | outFile |
| write | WriteJPEG | 2 | scale  outStrm |

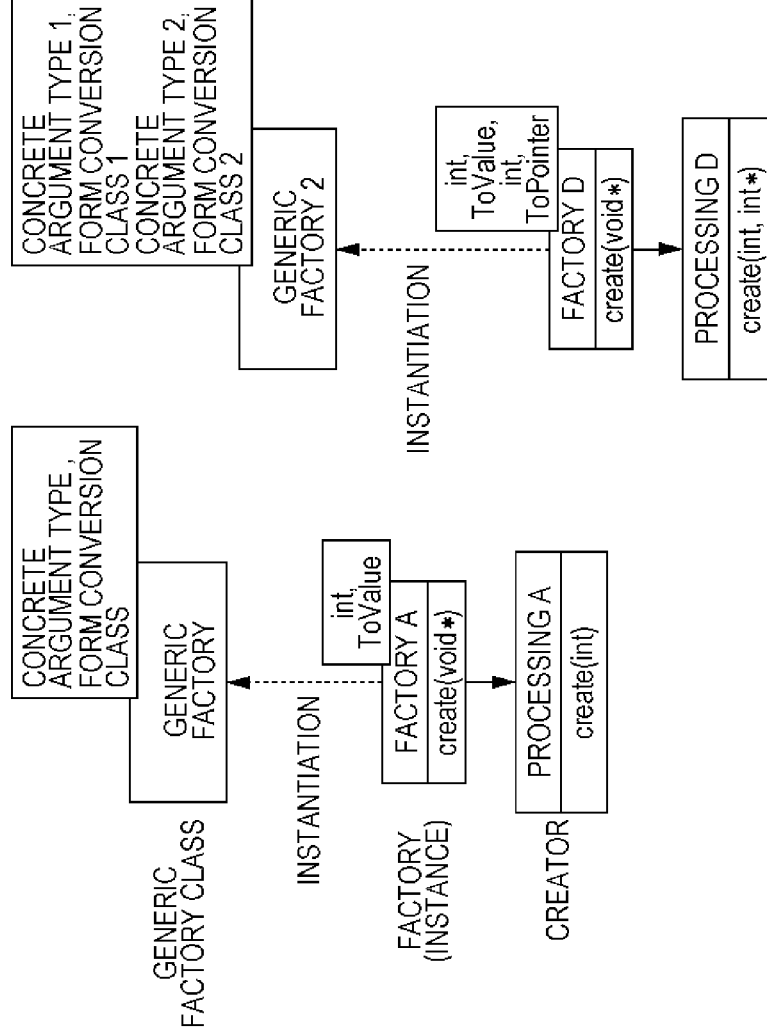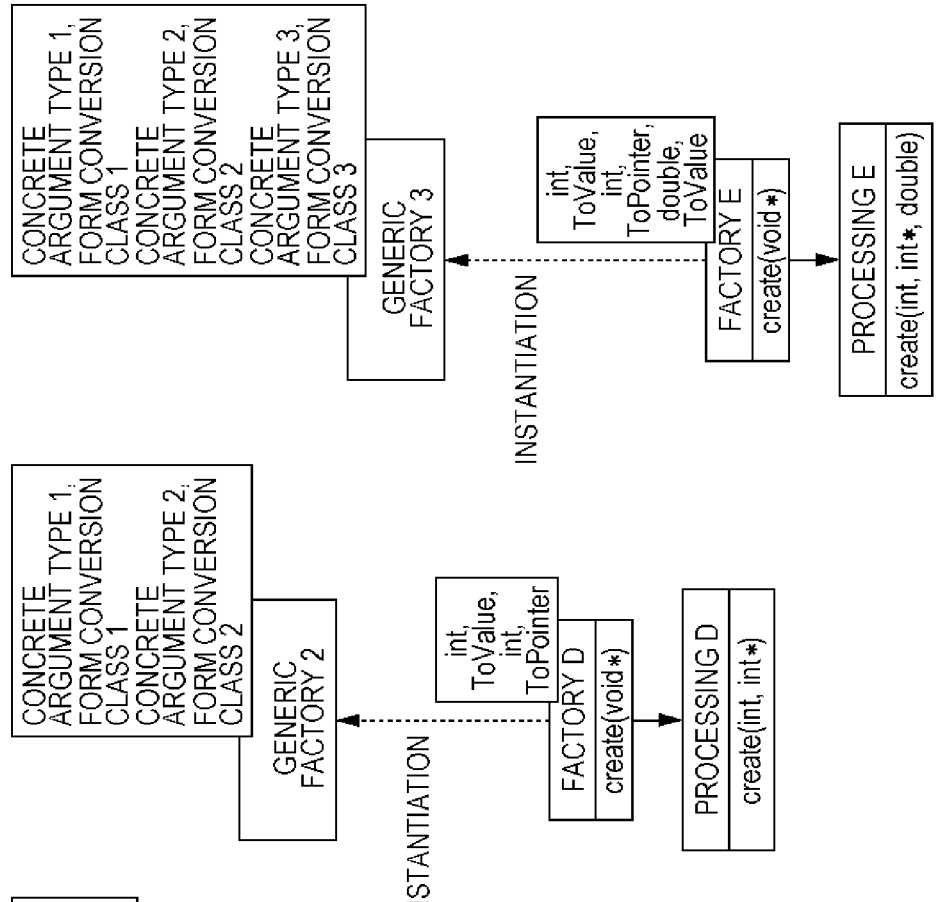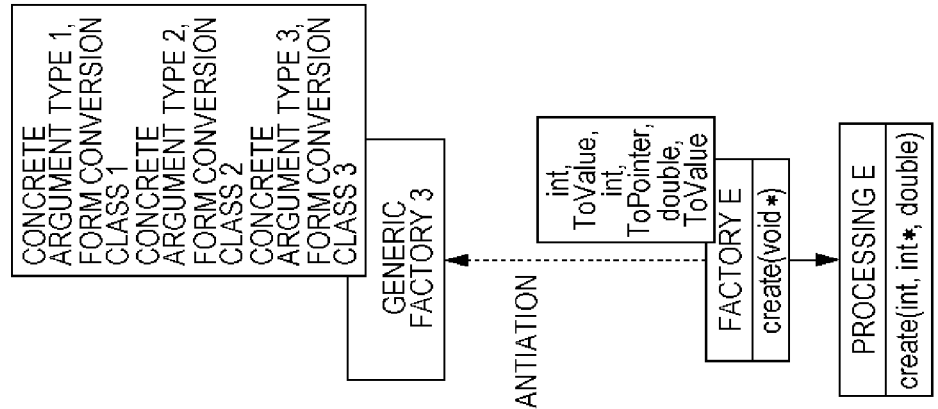

FIG. 10

```
/**
 * Factory used when the number of arguments is four
 */
template <class Creator, class Result,
          typename Arg0, class Resolver0,
          typename Arg1, class Resolver1,
          typename Arg2, class Resolver2,
          typename Arg3, class Resolver3>
class EngineFactory4 : public ObjectFactory<Result> {

// Structure of pointers of concrete arguments
struct Arg {
    Arg0* arg0;
    Arg1* arg1;
    Arg2* arg2;
    Arg3* arg3;
};
public:
    typedef typename ObjectFactory<TResult>::Result Result;

EngineFactory4()
    {
    }
    ~EngineFactory4()
    {
    }
```

- 100: `/** * Factory used when the number of arguments is four */`
- 102: `template ... class EngineFactory4 : public ObjectFactory<Result> {`
- 104: `struct Arg { Arg0* arg0; Arg1* arg1; Arg2* arg2; Arg3* arg3; };`

```
virtual Result create_object(void* arg)          ~110
{
    if (arg==NULL)                               }112
        return NULL;

// Conversion from abstract argument void* to
    // concrete argument pointer structure pointer
    const Arg* args=reinterpret_cast<const Arg*>(arg);   }114
    if (args==NULL)
        return NULL;

// Create engine creator
    Creator creator(Resolver0::convert(args->arg0));     }116

// Create image processing engine
    return creator.engine(Resolver1::convert(args->arg1),
                          Resolver2::convert(args->arg2),   }118
                          Resolver3::convert(args->arg3));
}
};
```

FIG. 11

```
extern"C"{

ObjectFactory<Engine*>*load_ReadPNGFactory(){
    return new EngineFactory3<
      ReadPNG,  Engine*,
      Manager,  Reference,
      InputStream, Pointer>;
  }

}
```

200 — ObjectFactory<Engine*>*load_ReadPNGFactory(){
202 — return new EngineFactory3<
204 — ReadPNG, Engine*, Manager, Reference, InputStream, Pointer>;

FIG. 12A

Related art

```
TextReader tr;
String s;
Manager mgr;
InputStorage* is = NULL;
Engine*    eng = NULL;

while(tr.read(&s)){
  if(s=="FileInputStorage"){
    tr.read(&s); // Read file name
    is = FileInputStorage::create(mgr, s);
  }
  else if(s=="ReadRaster"){
    eng = ReadRaster(mgr).engine(is);   ~301
  }
  else if(s=="Scale"){
    tr.read(&s); // Read scaling factor  ~302
    Float m = atof(s);
    eng = Scale(mgr).engine(eng, m, m);  ~303
  }
  ⁾⁾
}
```
300

FIG. 12B

Exemplary embodiment

```
TextReader tr;
String s;
Engine* eng = NULL;

while(tr.read(&s)){
  // Factory DLL name  ~400
  String dll_name=s+".so";
  // Name of function creating factory  ~402
  String func_name="load_"+s+"Factory";

// Load factory  ~404
  void*handle=dlopen(dll_name, RTLD_LAZY);
  // Obtain factory creation function        ~406
  FactoryCreator*fc=dlsym(handle, func_name);
  // Create factory  ~408
  Factory*factory=(*fc)();
                                     ~410
  // Read arguments according to the number of
  arguments and create argument object
  tr.read(&s);
  int argc=atoi(s);
  void*args=new void*[argc];
  ...
  // Create object  ~412
  void* obj=factory->create_object(args);
  ...
}
```

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This application is based on and claims priority under 35 USC 119 from Japanese Patent Application No. 2011-002200 filed Jan. 7, 2011.

BACKGROUND (i) Technical Field

The present invention relates to an image processing apparatus, an image processing method, and a non-transitory computer-readable storage medium.

SUMMARY

According to an aspect of the invention, there is provided an image processing apparatus including plural module creating units, plural wrapper creating units, an extracting unit, a calling unit, and an argument processing unit. The plural module creating units create, when called, processing modules that are obtained by instantiating plural different types of image processing classes by using functions to which a common function name is given and to which arguments unique to the image processing classes are specified. The plural wrapper creating units create, when called, wrappers that call the module creating units when created and that pass arguments specified in a pointer form in which an argument type is indefinite to the module creating units in an argument type and a form that are usable by the module creating units. The extracting unit extracts, from image processing information for executing a series of image processing operations by coupling plural processing modules obtained by instantiating the image processing classes, class names of the image processing classes corresponding to the individual processing modules and the arguments unique to the image processing classes. The calling unit converts the extracted class names in accordance with a predetermined rule and calls the wrapper creating units to which the converted class names are given. The argument processing unit stores the extracted arguments in an array, specifies an initial address of the array in the pointer form in which an argument type is indefinite, and passes the initial address to the created wrappers.

BRIEF DESCRIPTION OF THE DRAWINGS

Exemplary embodiment(s) of the present invention will be described in detail based on the following figures, wherein:

FIG. 1 is a block diagram illustrating a schematic configuration of a computer (image processing apparatus) according to an exemplary embodiment of the present invention;

FIG. 6 is a diagram illustrating a specific example of the image processing instructions;

FIG. 9A is a model diagram in a case where the number of arguments is one;

FIG. 9B is a model diagram in a case where the number of arguments is two;

FIG. 9C is a model diagram in a case where the number of arguments is three;

FIG. 10 is a diagram illustrating a coding example of a generic factory class;

FIG. 11 is a diagram illustrating a coding example of a factory creation function;

FIG. 12A is a diagram illustrating a coding example according to the related art of performing hard coding by defining individual arguments in accordance with an argument type and a form for individual module creating units in accordance with a processing module to be created; and FIG. 12B is a diagram illustrating a coding example of a main program according to the exemplary embodiment in the case of calling a module creating unit by creating a factory.

DETAILED DESCRIPTION

Figure 2A:
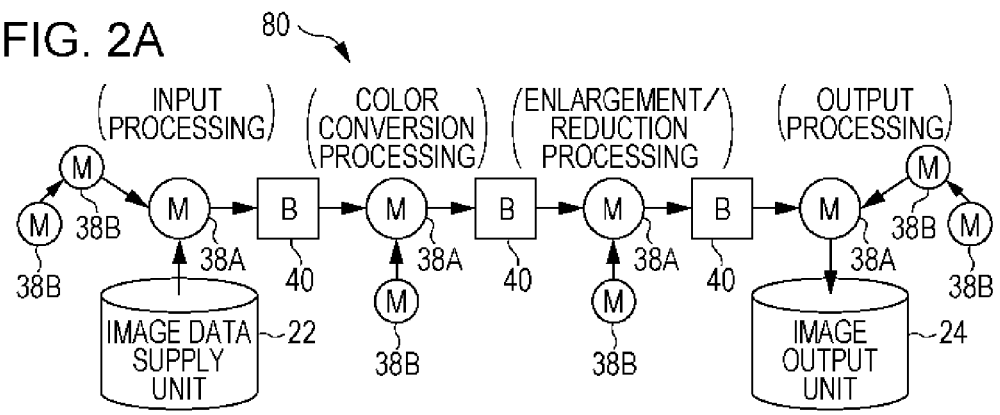
FIGS. 2A to 2C are block diagrams illustrating example configurations of an image processing unit.

Hereinafter, an exemplary embodiment of the present invention will be described in detail with reference to the attached drawings. FIG. 1 illustrates a computer 10 capable of functioning as an image processing apparatus. The computer 10 may be incorporated into an arbitrary image handling apparatus that performs image processing therein, such as a copying machine, printer, facsimile apparatus, multifunction apparatus having these functions, scanner, or photograph printer. Alternatively, the computer 10 may be an independent computer, such as a personal computer (PC). Furthermore, the computer 10 may be a computer incorporated into a mobile apparatus, such as a personal digital assistant (PDA) or mobile phone.

The computer 10 includes a central processing unit (CPU) 12, a memory 14, a display unit 16, an operation unit 18, a storage unit 20, an image data supply unit 22, and an image output unit 24. These devices are mutually connected via a bus 26. In a case where the computer 10 is incorporated into the foregoing image handling apparatus, a display panel formed of a liquid crystal display (LCD) and a numeric keypad or the like provided on the image handling apparatus may be applied as the display unit 16 and the operation unit 18. In a case where the computer 10 is an independent computer, a display, keyboard, and mouse or the like connected to the computer may be applied as the display unit 16 and the operation unit 18. A hard disk drive (HDD) is appropriate as the storage unit 20, but another nonvolatile storage unit, such as a flash memory, may be used instead.

The image data supply unit 22 supplies image data to be processed. For example, an image reading unit that reads an image recorded on a recording material such as paper or photographic film and outputs image data, a receiving unit that receives image data from the outside via a communication line, or an image storage unit that stores image data (memory 14 or storage unit 20) may be applied thereto. The image output unit 24 outputs image data on which image processing has been performed or an image represented by the image data. For example, an image recording unit that records an image represented by image data on a recording material such as paper or photosensitive material, a display unit that displays an image represented by image data on a display or the like, a writing device that writes image data on a recording medium, or a transmitting unit that transmits image data via a communication line may be applied thereto. Alternatively, the image output unit 24 may be an image storage unit that simply stores image data on which image processing has been performed (memory 14 or storage unit 20).

As illustrated in FIG. 1, the storage unit 20 stores various programs executed by the CPU 12: a program of an operating system 30 that controls management of resources including the memory 14, management of execution of a program by the CPU 12, and communication between the computer 10 and an external apparatus; an image processing program group 34 for causing the computer 10 to function as the image processing apparatus according to the exemplary embodiment of the present invention; and programs of various applications 32 (illustrated as application program group 32 in FIG. 1) for causing the image processing apparatus, which is realized when the CPU 12 executes the image processing program group 34, to perform desired image processing.

The image processing program group 34 includes programs that have been developed so as to be used in common by various image handling apparatuses, mobile apparatuses, and various apparatuses such as PCs (platforms), for the purpose of reducing development loads at the time of developing the foregoing various image handling apparatuses and mobile apparatuses and reducing development loads at the time of developing image processing programs usable in PCs or the like. The image processing apparatus realized by the image processing program group 34 constructs an image processing unit that performs image processing in accordance with construction instructions based on image processing instructions (a file containing a description of image processing to be executed and corresponds to image processing information according to the exemplary embodiment of the present invention, a specific example will be described below) provided from the applications 32, and performs image processing using the image processing unit (this will be described in detail below). The image processing program group 34 provides, to the applications 32, an interface for providing instructions to construct an image processing unit that performs desired image processing (an image processing unit having a desired configuration), and for providing instructions to execute image processing by the constructed image processing unit. Thus, in the case of newly developing an apparatus that performs image processing therein, a program for performing the image processing may be developed by simply developing the applications 32 that cause the image processing program group 34 to perform the image processing necessary in the apparatus using the foregoing interface. Accordingly, the necessity for newly developing a program that actually performs image processing is eliminated, so that the development loads may be reduced.

Also, the image processing apparatus realized by the image processing program group 34 constructs the image processing unit in accordance with the construction instructions based on the image processing instructions provided from the applications 32, and performs image processing using the constructed image processing unit, as described above. Thus, even if the color space or the number of bits per pixel of the image data to be processed is indefinite, or if the details, procedures, or parameters of the image processing to be executed are indefinite, the image processing executed by the image processing apparatus (image processing unit) may be flexibly changed in accordance with the image data or the like to be processed if the applications 32 provide instructions to re-reconstruct the image processing unit in accordance with image processing instructions.

Figure 2B:
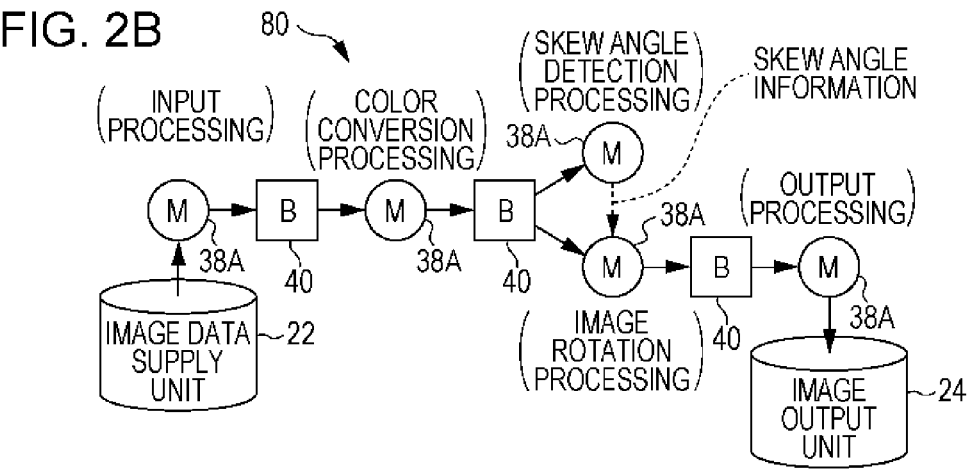
Figure 2C:
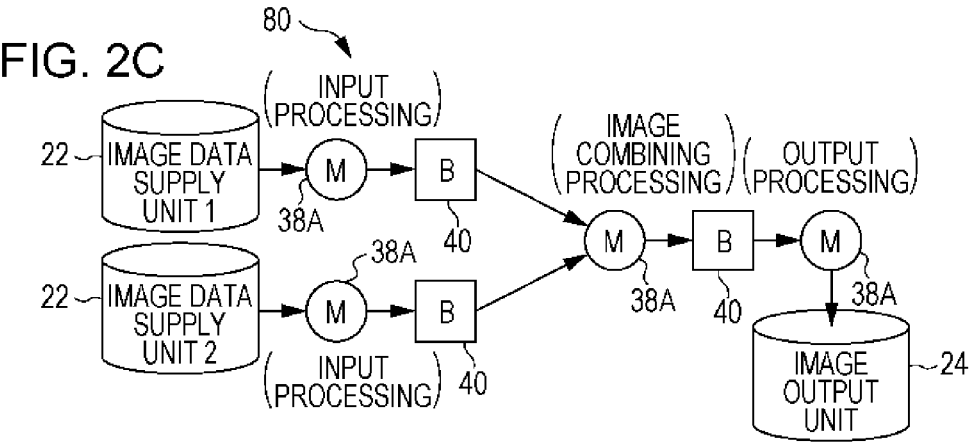

Hereinafter, the image processing program group 34 will be described. In this exemplary embodiment, the image processing program group 34 is described in an object-oriented programming language. As illustrated in FIG. 1, the image processing program group 34 roughly includes an image processing class library 36, programs of a processing construction unit 42, programs of a processing management unit 46, programs of an instruction interpretation executing unit 48, a generic factory class library 50, a form conversion class library 54, and a factory creation function library 58. The processing construction unit 42 according to this exemplary embodiment constructs, in response to instructions provided from an application, an image processing unit 80 including one or more image processing modules 38A that perform predetermined image processing, and buffer modules 40 that are arranged in at least one of the preceding stage and the subsequent stage of the individual image processing modules 38A and that have a buffer for storing image data, the image processing modules 38A and the buffer modules 40 being connected in a pipeline form or a directed acyclic graph (DAG) form, as illustrated in FIGS. 2A to 2C as an example (this will be described in detail below). Also, support modules 38B may be connected to the image processing modules 38A. Each of the support modules 38B does not have an image processing engine for actually performing image processing on image data and provides information necessary for image processing performed by the image processing module 38A. In this exemplary embodiment, the image processing modules 38A and the support modules 38B are collectively referred to as processing modules 38. In FIGS. 2B and 2C, the illustration of the support modules 38B is omitted.

The entity of the individual processing modules 38 forming the image processing unit 80 is a program that is executed by the CPU 12 and that causes the CPU 12 to perform predetermined image processing, or a program that is executed by the CPU 12 and that causes the CPU 12 to instruct an external image processing apparatus (for example, a dedicated image processing board, not illustrated in FIG. 1) to execute processing. The above-described image processing class library 36 includes the codes (programs) of image processing classes registered therein. The image processing classes correspond to plural types of image processing modules 38A and support modules 38B that are created through instantiation and that perform predetermined image processing operations different from each other (for example, input processing, filter processing, color conversion processing, enlargement/reduction processing, skew angle detection processing, image rotation processing, image combining processing, output processing, etc.). The processing modules 38 are created by instantiating the image processing classes. Note that the processing modules 38 may be referred to as objects.

Each of the image processing modules 38A includes, although not illustrated, an image processing engine that performs image processing on image data in units of predetermined unit processing data amounts, and a controller that controls the input/output of image data from/to the modules in the preceding and subsequent stages of the image processing module 38A and that controls the image processing engine. The unit processing data amount in each image processing module 38A is selected and set in advance in accordance with the type of image processing to be performed by the image processing engine, from among arbitrary numbers of bytes corresponding to one line of an image, plural lines of an image, one pixel of an image, one whole image, etc. For example, in the image processing module 38A that performs color conversion processing or filter processing, the unit processing data amount is one pixel of an image. In the image processing module 38A that performs enlargement/reduction processing, the unit processing data amount is one line of an image or plural lines of an image. In the image processing module 38A that performs image rotation processing, the unit processing data amount is one whole image. In the image processing module 38A that performs image compression/decompression processing, the unit processing data amount is N bytes that depend on execution environment.

Also, the image processing class library 36 includes image processing classes of the image processing modules 38A having image processing engines that execute image processing operations that are of the same category and different in terms of operation details (in FIG. 1, these types of image processing modules are illustrated as "module 1" or "module 2"). For example, as for the image processing module 38A that performs enlargement/reduction processing, there are provided plural image processing modules 38A, such as an image processing module 38A that performs reduction processing of reducing input image data to 50% by thinning it every other pixel, and an image processing module 38A that performs enlargement/reduction processing using an enlargement/reduction ratio specified for input image data. Also, for example, as for the image processing module 38A that performs color conversion processing, there are provided an image processing module 38A that converts an RGB color space into a CMY color space, an image processing module 38A that converts a CMY color space into an RGB color space, and an image processing module 38A that performs color space conversion of an L*a*b* color space or the like.

In order to input image data necessary for the image processing engine to process the image data in units of unit processing data amounts, the controller of the image processing module 38A obtains image data from the module in the preceding stage (for example, the buffer module 40) in units of unit readout data amounts, and outputs the image data output from the image processing engine to the module in the subsequent stage (for example, the buffer module 40) in units of unit write data amounts (unit write data amount=unit processing data amount if image processing that causes increase/decrease in data mount is not performed in the image processing engine), or outputs the result of image processing performed by the image processing engine to the outside of the image processing module 38A (for example, if the image processing engine performs image analysis processing, such as skew angle detection processing, an image analysis processing result such as a skew angle detection result may be output instead of image data). However, the image processing class library 36 also includes classes of the image processing modules 38A having image processing engines that execute image processing operations that are of the same category, that are the same in terms of operation details, and that are different in terms of unit processing data amount, unit readout data amount, and unit write data amount. For example, in the above-described case, the unit processing data amount in the image processing module 38A that performs image rotation processing corresponds to one whole image. However, the image processing class library 36 may include the class of the image processing module 38A that performs image rotation processing in which the unit processing data amount corresponds to one line of an image or plural lines of an image.

As described above, the support module 38B that is necessary for image processing performed by the image processing module 38A may be connected to the image processing module 38A. For example, in a case where the image processing module 38A is a module that reads out image data, the support module 38B that provides a character string representing the file of image data to be read may be connected thereto. The support module 38B is not connected to the buffer module 40 (see FIG. 2A). Although not illustrated in FIG. 1, the classes of the support modules 38B are also registered as image processing classes in the image processing class library 36.

Each of the buffer modules 40 forming the image processing unit 80 includes a buffer constituted by a memory region that is obtained from the memory 14 provided in the computer 10 through the operating system 30, and a buffer controller that performs the input/output of image data from/to the modules in the preceding and subsequent stages of the buffer module 40 and that manages the buffer. The entity of the buffer controller of each buffer module 40 is a program executed by the CPU 12, and a program of the buffer controller is also registered in the image processing class library 36 (the program of the buffer controller is illustrated as "buffer module" in FIG. 1).

The processing construction unit 42, which constructs the image processing unit 80 in accordance with instructions based on the image processing instructions provided from the applications 32, is constituted by plural types of module creating units 44, as illustrated in FIG. 1 (hereinafter also refereed to as "creators 44"). The plural types of module generating units 44 correspond to different image processing operations, and are activated (called) in accordance with the image processing instructions provided from the applications 32, thereby performing processing of creating a module group including the image processing modules 38A, the support modules 38B, and the buffer modules 40 for realizing corresponding image processing operations (instantiating classes). In FIG. 1, the module creating units 44 corresponding to the types of image processing operations executed by the respective image processing modules 38A registered in the image processing class library 36 are illustrated as an example. The image processing corresponding to each module creating unit 44 may be image processing realized by plural types of image processing modules 38A (for example, skew correction processing including skew angle detection processing and image rotation processing). If necessary image processing is processing including plural types of image processing operations, the module creating units 44 corresponding to the plural types of image processing operations are sequentially activated. The sequentially activated module creating units 44 construct the image processing unit 80 that performs the necessary image processing. In this image processing apparatus, the application 32 do not directly create the processing module 38, but the factory 70 illustrated in FIG. 3 (corresponding to "wrapper" according to the exemplary embodiment of the invention) is created, the module creating unit 44 is called from the factory 70, and the processing module 38 is created, in accordance with instructions provided from the application 32. The factory 70 functions as a wrapper with respect to the module creating unit 44, so that a difference of an argument of a function (concrete function) executed by the module creating unit 44 is absorbed by the factory 70.

Figure 3:
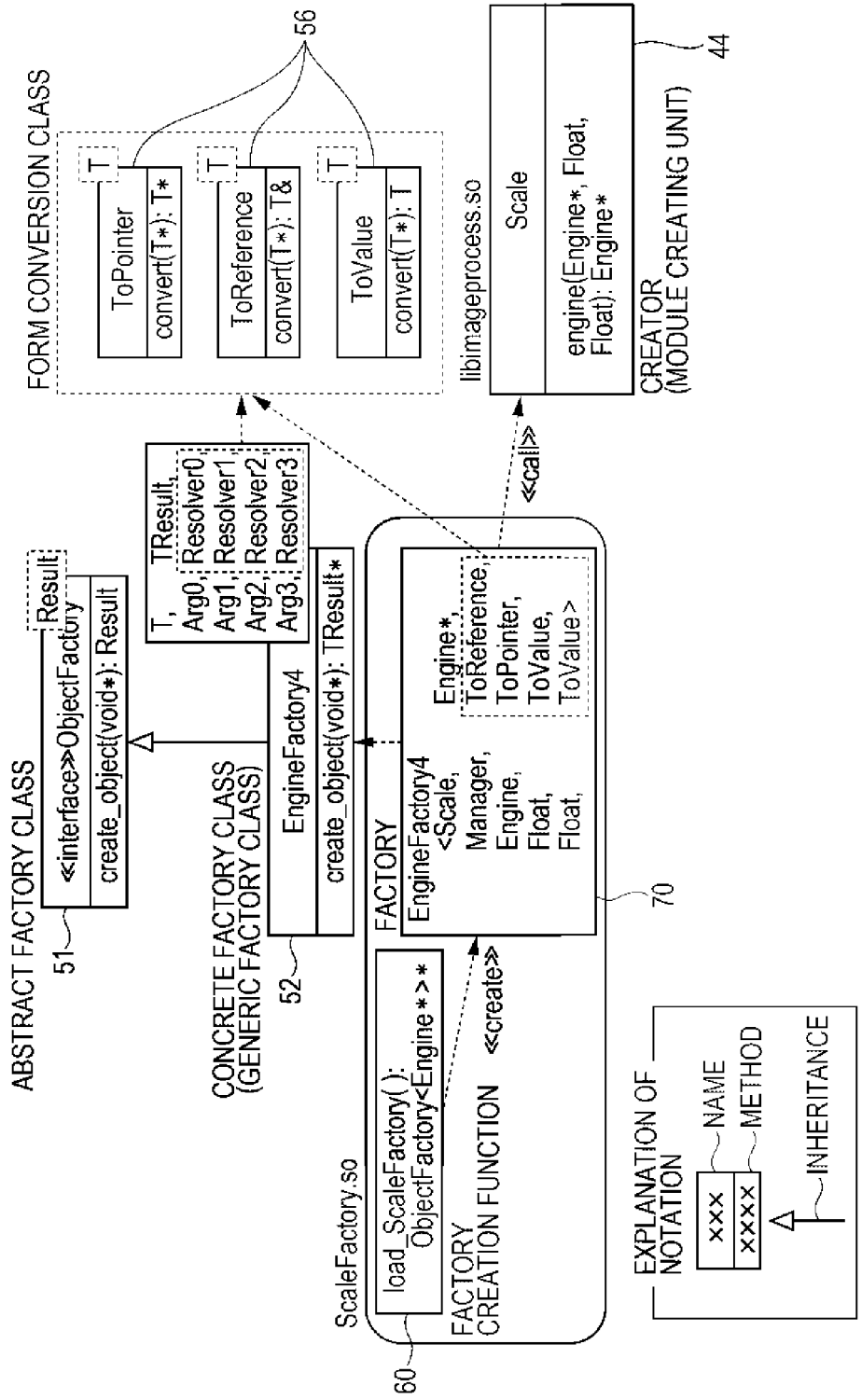
FIG. 3 is a model diagram illustrating an object-oriented model regarding a factory.

FIG. 3 is a model diagram illustrating an object-oriented model regarding the factory 70. Here, in accordance with the notation of object orientation, a class name is described in the upper stage of a rectangle, and a method is described in the lower stage thereof, and an arrow represents inheritance. Here, FIG. 3 illustrates the factory 70 that calls the module creating unit 44 that creates the image processing module 38A that performs enlargement/reduction processing called "Scale".

As illustrated in FIG. 3, the module creating unit 44 is called by the factory 70. The factory 70 is created by a factory creation function 60. The factory 70 is created by instantiating a concrete factory class (generic factory class 52) that inherits an abstract factory class 51, and has a function of calling the module creating unit 44 and passing an argument (the value used for the function executed by the processing module 38) specified in the image processing instructions to the module creating unit 44. Here, the names of functions executed by the individual module creating units 44 that create the image processing modules 38A are the same (for example, Engine ( )), but the arguments thereof may be different (in at least one of the number of arguments and the types of arguments). Also, the names of functions of the individual module creating units 44 that create the support modules 38B are the same (for example, Create ( )), but the arguments thereof may be different (in at least one of the number of arguments and the types of arguments) (also see the method of the individual module creating units 44 in FIG. 5). Therefore, in this exemplary embodiment, the following scheme is performed in the case of creating the factory 70.

In the generic factory class 52, the type of argument (hereinafter referred to as "argument type") is defined in an abstract state (as illustrated in FIG. 3, the argument type is indefinite "void*(void pointer)"). The size of argument is determined in accordance with an argument type. However, in such an abstract state, the argument type is indefinite and is required to be concerted so that the module creating unit 44 may interpret it. For this reason, an argument type is concerted when creating the factory 70 from the generic factory class 52.

Also, in this exemplary embodiment, in the generic factory class 52, individual arguments are handled using an array of pointers that store the initial address values of the respective arguments so that the arguments to be used may have any size. However, the module creating unit 44 is not always capable of using individual arguments obtained through pass by pointer. That is, the module creating unit 44 may only be capable of using arguments obtained through pass by reference or pass by value, depending on the type of the module creating unit 44. Therefore, it is necessary to pass arguments to the module creating unit 44 in such a form that the module creating unit 44 is capable of handling the arguments, for example, pass by pointer, pass by value, or pass by reference. Hereinafter, the "type" of passing arguments is referred to as "form" in order to distinguish it from the foregoing argument type. Thus, the factory 70 is created so that arguments may be passed to the module creating unit 44 in such a form that the module creating unit 44 is capable of using the arguments.

First, as for an argument type, an array structure having array elements (pointers) the number of which corresponds to the number of arguments is defined, and the type of each argument (argument type) is specified for each array element, thereby converting the argument type to a concrete argument type. In the factory 70 named "EngineFactory4" illustrated in FIG. 3, the four argument types Manager, Engine, Float, and Float are specified for the four array elements Arg0 through Arg3. For example, Manager represents processing management, Engine represents an image processing engine, and Float represents a variable of a floating point.

Furthermore, at the time of passing arguments to the module creating unit 44, it is necessary to convert the form into the form of passing the individual arguments specified by pointers to the module creating unit 44 (for example, value, reference, or, pointer). Form conversion classes 56 are used for the conversion. The form conversion classes 56 include, for example, "ToPointer" for converting pointer to pointer, "ToReference" for converting pointer to reference, and "ToValue" for converting pointer to value. The factory 70 is created in a state where the form conversion classes 56 are specified for each of the array elements of arguments. In the factory 70 named "Enginefactory4" illustrated in FIG. 3, the form conversion class 56 of "ToReference" is specified for an argument of the argument type. "Manager", the form conversion class 56 of "ToPointer" is specified for an argument of the argument type "Engine pointer", and the form conversion class 56 of "ToValue" is specified for two arguments of the argument type "Float".

FIG. 10 illustrates a coding example of the generic factory class 52. The generic factory class 52 illustrated in FIG. 10 is used as a template of the factory 70 having four arguments.

The template arguments of the generic factory class 52 are defined in the section denoted by reference numeral 100. Specifically, the module creating unit 44 called by the generic factory class 52 is regarded as Creator, the return value type of the module creating unit 44 is regarded as Result, and four arguments and the form conversion classes 56 (Resolvers) for the respective arguments are defined. In the section denoted by reference numeral 102, it is declared that this class is the generic factory class 52 having a class name "EngineFactory4". In the section denoted by reference numeral 104, the structure of pointers of four concrete arguments is declared as an array of arguments.

In the section denoted by reference numeral 110, a virtual function is declared. In the section denoted by reference numeral 112, so-called error processing is performed in which "NULL" is returned if there is nothing in the initial address of the structure of an argument. In the section denoted by reference numeral 114, argument types are defined for the array elements of the arguments represented by the structure declared in the section denoted by reference numeral 104, and processing of conversion from void* of an abstract argument type pointer to a pointer of a structure of a pointer of a concrete argument is performed. In the sections denoted by reference numerals 116 and 118, the processing executed by the factory 70 is declared (call of the module creating unit 44, form conversion processing by the form conversion classes 56).

FIG. 11 illustrates a coding example of the factory creation function 60. The factory creation function 60 named "load_ReadPNGFactory" is defined in the section denoted by reference numeral 200. Also, in the section denoted by reference numeral 202, it is described that an object is created by a new operator using the generic factory class 52 named "EngineFactory3" as a template class. In the section denoted by reference numeral 204, the argument types and forms of three arguments are defined. The factory creation function 60 is created by a user and is registered in advance in the factor creation function library 58.

Note that, as illustrated in FIG. 1, the generic factory classes 52 are registered in the generic factory class library 50, and the form conversion classes 56 are registered in advance in the form conversion class library 54. Also, the factory creation functions 60 are registered in the factory creation function library 58.

In the case of adding a new function to the image processing apparatus, it is necessary to additionally register the image processing class of the processing module 38 that provides the new function in the image processing class library 36, additionally register the module creating unit 44 in the processing construction unit 42, and additionally register the factory creation function 60 corresponding thereto in the factory creation function library 58, before constructing the image processing unit 80 having the function.

When the factory 70 calls the module creating unit 44, arguments are passed from the factory 70 to the module creating unit 44 in a state where the arguments are concerted by specifying argument types and forms (form conversion classes 56). Accordingly, the module creating unit 44 creates an object (processing module 38) by instantiating the corresponding image processing class.

In the factory 70, argument types and forms are merely converted, and thus call overhead does not increase (because communication is not performed), compared to the case of adding a new function by using a Web service.

The module creating unit 44 that creates the image processing module 38A creates, if necessary, the buffer modules 40 that are to be connected in the preceding and subsequent stages of the image processing module 38A. Finally, the image processing unit 80 is constructed in which the processing modules 38 and the buffer modules 40 created by the module creating units 44 called by the factories 70 are mutually connected.

Then, the processing management unit 46 illustrated in FIG. 1 controls the execution of image processing performed in the image processing unit 80 constructed in the above-described manner, manages the use of the resources of the computer 10, such as the memory 14 and various files, by the individual modules of the image processing unit 80, and manages errors that occur in the image processing unit 80.

In this exemplary embodiment, the image processing unit 80 constructed by the processing construction unit 42 is capable of operating so that the individual image processing modules 38A forming the image processing unit 80 perform image processing in parallel while passing image data to the subsequent stage in units of data amounts smaller than the data amount of one whole image (referred to as processing in units of blocks) and is capable of operating so that, after the image processing module 38 in the present stage has completed image processing on the image data of one whole image, the image processing module 38 in the subsequent stage performs image processing on the image data of another whole image (referred to as processing in units of images). A program for causing the image processing unit 80 to perform processing in units of blocks and a program for causing the image processing unit 80 to perform processing in units of images are prepared as the programs of the processing management unit 46.

Now, the execution control of image processing performed by the processing management unit 46 will be briefly described. First, the case of performing processing in units of blocks will be described. Here, the description of the support modules 38B is omitted, and description will be given by focusing attention on the entire flow of the image processing. The processing management unit 46 inputs a request for processing to the image processing module 38A in the last stage of the constructed image processing unit 80 (see (1) in FIG. 4). In the image processing unit 80 illustrated in FIG. 4, when the request for processing is input from the processing management unit 46 to the image processing module 38A$_4$ in the last stage, the controller of the image processing module 38A$_4$ inputs a request for readout to the buffer module 40$_3$ in the preceding stage (see (2) in FIG. 4). At this time, effective data (image data) that is readable by the image processing module 38A$_4$ is not stored in the buffer of the buffer module 40$_3$, and thus the buffer controller of the buffer module 40$_3$ inputs a request for data to the processing management unit 46 (see (3) in FIG. 4).

Figure 4:
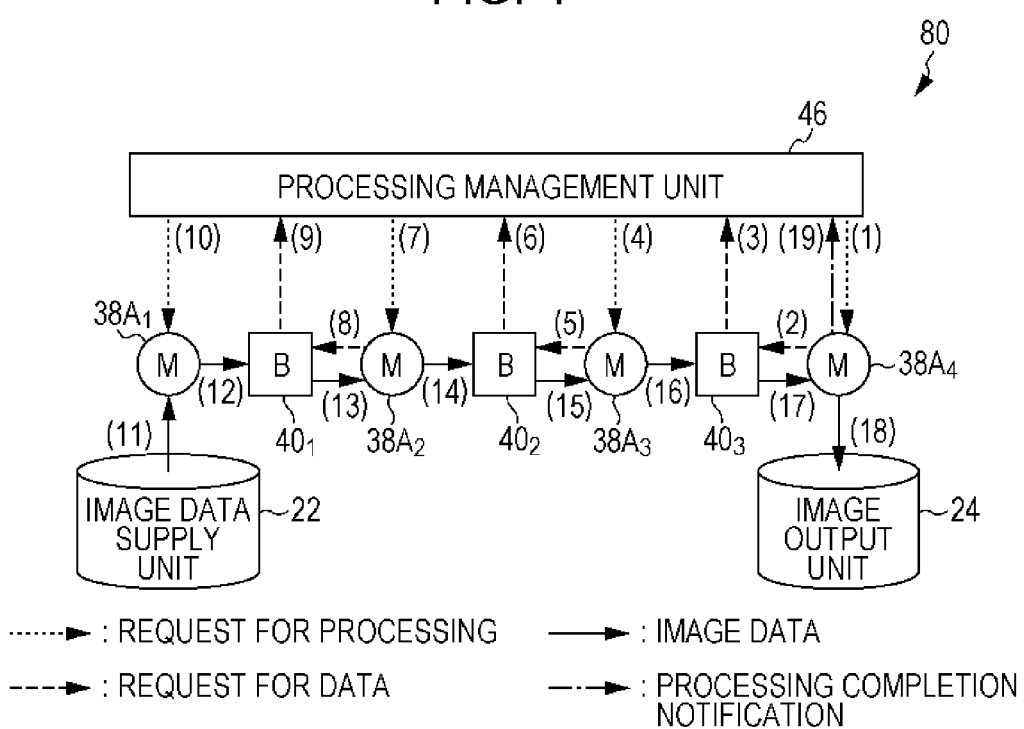
FIG. 4 is a schematic diagram describing a flow of processing in units of blocks in a mode where buffer modules directly request image data to image processing modules in the preceding stages.

The processing management unit 46 recognizes the image processing module 38A (the image processing module 38A$_3$) in the preceding stage of the buffer module 40 (the buffer module 40$_3$) that has input the request for data on the basis of the information registered in a predetermined table, and inputs a request for processing to the recognized image processing module 38A in the preceding stage (see (4) in FIG. 4).

When the request for processing is input, the controller of the image processing module 38A$_3$ inputs a request for readout to the buffer module 40$_2$ in the preceding stage (see (5) in FIG. 4). Since readable image data is not stored in the buffer of the buffer module 40$_2$, the buffer controller of the buffer module 40$_2$ inputs a request for data to the processing management unit 46 (see (6) in FIG. 4). The processing management unit 46 receives the request for data from the buffer module 40$_2$, and inputs a request for processing to the image processing module 38A$_2$ in the preceding stage (see (7) in FIG. 4). Then, the controller of the image processing module 38A$_2$ inputs a request for readout to the buffer module 40$_1$ (see (8) in FIG. 4). Since readable image data is not stored also in the buffer of the buffer module 40$_1$, the buffer controller of the buffer module 40$_1$ inputs a request for data to the processing management unit 46 (see (9) in FIG. 4). The processing management unit 46 receives the request for data from the buffer module 40$_1$, and inputs a request for processing to the image processing module 38A$_1$ in the preceding stage (see (10) in FIG. 4).

Here, the module in the preceding stage of the image processing module 38A$_1$ is the image data supply unit 22. Thus, the controller of the image processing module 38A$_1$ inputs a request for data to the image data supply unit 22, thereby obtaining image data of a unit readout data amount from the image data supply unit 22 (see (11) in FIG. 4). Then, the image processing engine of the image processing module 38A$_1$ performs image processing on the obtained image data, and then the image processing module 38A$_1$ writes the processed image data on the buffer of the buffer module 40$_1$ in the subsequent stage (see (12) in FIG. 4). After completing the writing of the image data on the buffer of the buffer module 40$_1$ in the subsequent stage, the controller of the image processing module 38A$_1$ inputs a processing completion notification to the processing management unit 46.

The processing management unit 46 determines whether or not the source of the processing completion notification is the image processing module 38A in the last stage of the image processing unit 80. In this case, a negative determination is made, and the processing ends without performing nothing (this is the same in a case where a processing completion notification is input from the image processing module 38A$_2$ or 38A$_3$).

After a unit readout data amount or more of effective image data readable by the image processing module 38A$_2$ has been written, the buffer controller of the buffer module 40$_1$ requests the image processing module 38A$_2$ to read the image data. Accordingly, the controller of the image processing module 38A$_2$ reads a unit readout data amount of the image data from the buffer of the buffer module 40$_1$ (see (13) in FIG. 4), the image processing engine of the image processing module 38A$_2$ performs image processing on the obtained image data, and the image processing module 38A$_2$ writes the processed image data on the buffer of the buffer module 40$_2$ in the subsequent stage (see (14) in FIG. 4). After a unit readout data amount or more of effective image data readable by the image processing module 38A$_3$ has been written, the buffer controller of the buffer module $40_2$ requests the image processing module $38A_3$ to read the image data. Accordingly, the controller of the image processing module $38A_3$ reads a unit readout data amount of the image data from the buffer of the buffer module $40_2$ (see (15) in FIG. 4), the image processing engine of the image processing module $38A_3$ performs image processing on the obtained image data, and the image processing module $38A_3$ writes the processed image data on the buffer of the buffer module $40_3$ in the subsequent stage (see (16) in FIG. 4).

Furthermore, after a unit readout data amount or more of effective image data readable by the image processing module $38A_4$ has been written, the buffer controller of the buffer module $40_3$ requests the image processing module $38A_4$ to read the image data. Accordingly, the controller of the image processing module $38A_4$ reads a unit readout data amount of the image data from the buffer of the buffer module $40_3$ (see (17) in FIG. 4), the image processing engine of the image processing module $38A_4$ performs image processing on the obtained image data, and the image processing module $38A_4$ outputs the processed image data to the image output unit 24, which is the module in the subsequent stage (see (18) in FIG. 4). Also, after completing the writing of the image data on the image output unit 24 in the subsequent stage, the controller of the image processing module $38A_4$ inputs a processing completion notification to the processing management unit 46 (see (19) in FIG. 4). The processing management unit 46 inputs a request for processing again to the image processing module $38A_4$, which is the image processing module 38A in the last stage.

In accordance with the re-input of the request for processing to the image processing module $38A_4$ in the last stage, the above-described processing sequence is repeated, so that image processing operations are sequentially performed on image data as a processing target supplied from the image data supply unit 22. Each of the image processing modules 38A inputs an entire processing end notification to the processing management unit 46 after performing image processing on the image data as a processing target. When receiving the entire processing end notification from the image processing module 38A in the last stage, the processing management unit 46 notifies the instruction interpretation executing unit 48 of the completion of the series of image processing operations. Accordingly, the instruction interpretation executing unit 48 notifies the application 32 of the completion of the series of image processing operations. After the series of image processing operations have been completed, the image processing modules 38A, the support modules 38B, and the buffer modules 40 perform erase processing of erasing themselves. Accordingly, the resources that had been used are released.

The processing in units of images is performed basically similarly to the above-described processing in units of blocks, in which image data is passed from a module to a module in the subsequent stage. However, there is a difference therebetween in terms of the following points. That is, in the processing in units of images, a request for processing input to the image processing module 38A in the last stage is sequentially passed to the image processing modules 38A in the preceding stages. After the request has reached the image processing module 38A in the first stage, a request for processing is repeatedly input only to the image processing module 38A in the first stage. After the image processing performed on the entire image data as a processing target in the image processing module 38A has completed, the image processing module 38A in the subsequent stage is caused to perform image processing on the entire image data as a processing target.

Then, the image processing modules 38A in the subsequent stages sequentially perform image processing, whereby a series of image processing operations are performed. A detailed description of the processing in units of images is omitted.

The instruction interpretation executing unit 48 illustrated in FIG. 1 interprets the image processing instructions received from the application 32, and performs control so that the processing modules 38 are created in accordance with the description of the image processing instructions and the image processing unit 80 is constructed, and that image processing is executed by using the processing management unit 46. Here, the flow of processing performed by the instruction interpretation executing unit 48 will be described by focusing attention especially on the processing of creating the factory 70.

Figure 5:
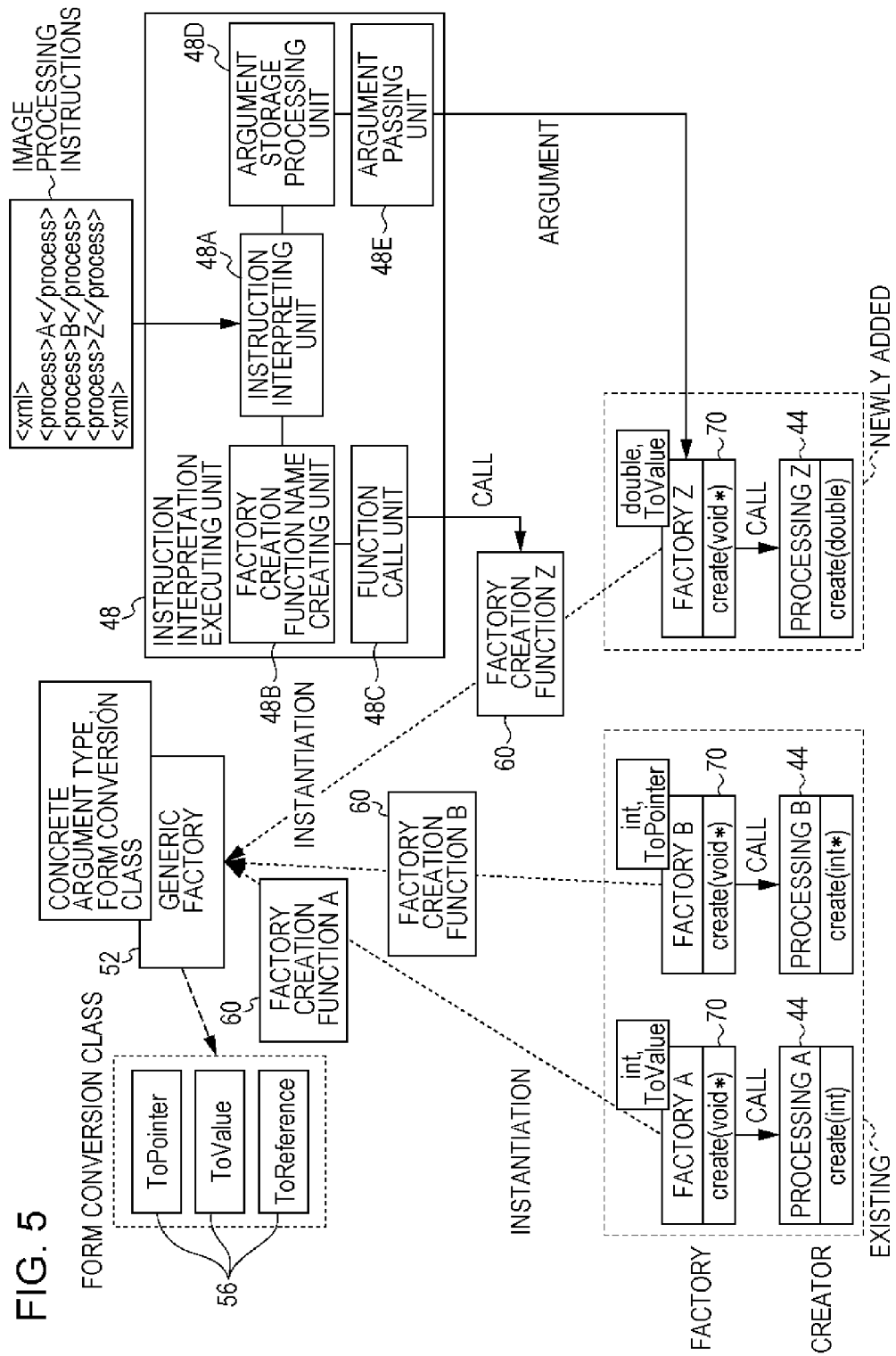
FIG. 5 is a schematic diagram illustrating a functional configuration of an instruction interpretation executing unit and a procedure from when image processing instructions are input to when a module creating unit is called.

FIG. 5 is a schematic diagram illustrating the functional configuration of the instruction interpretation executing unit 48 and the flow from when image processing instructions are input to when the module creating unit 44 is called.

The instruction interpretation executing unit 48 includes an instruction interpreting unit 48A, a factory creation function name creating unit 48B, a function call unit 48C, an argument storage processing unit 48D, and an argument passing unit 48E. The instruction interpreting unit 48A interprets image processing instructions received from the application 32 and extracts necessary information therefrom. FIG. 6 illustrates a specific example of the image processing instructions. As illustrated in FIG. 6, pieces of information about objects (processing modules 38) are listed in execution order of processing. As the pieces of information about the individual processing modules 38, variable names (the names of variables), type names, the numbers of arguments, and arguments are described in the image processing instructions in association with one another. The variable name is the name of an object, and is given as identification information unique to an object. The type name is the class name of the module creating unit 44 that creates an object. In this exemplary embodiment, the module creating units 44 and the factories 70 are associated with each other in a one-to-one relationship. Thus, the type name is also used as part of the name of the factory 70, and is also used as part of the function name of the factory creation function 60. The number of arguments is the number of arguments of an object. Also, arguments are listed in accordance with the number of arguments. The instruction interpreting unit 48A extracts these variable names, type names, the numbers of arguments, and arguments as the information about the processing modules 38.

The factory creation function name creating unit 48B creates the function name of the factory creation function 60 in accordance with a predetermined factory creation function name creation rule, on the basis of the information extracted by the instruction interpreting unit 48A (the type name in this exemplary embodiment). The function name created here serves as the name of the factory creation function 60 that is called as a function for creating the factory 70. The function call unit 48C calls the factory creation function 60 having the function name created by the factory creation function name creating unit 48B. The argument storage processing unit 48D performs processing of storing arguments in an array having array elements, the number of which corresponds to the number of arguments, on the basis of the number of arguments and the arguments extracted by the instruction interpreting unit 48A. The argument passing unit 48E passes an initial address of the array in which arguments are stored by the argument storage processing unit 48D to the factory 70.

In FIG. 5, the factories 70 and the module creating units 44 are illustrated with an existing function and a newly added function being separated. In any case, however, the factory creation function 60 is called to create the factory 70 from the generic factory class 52, and the module creating unit 44 is called from the factory 70 to create the processing module 38.

Figure 7:
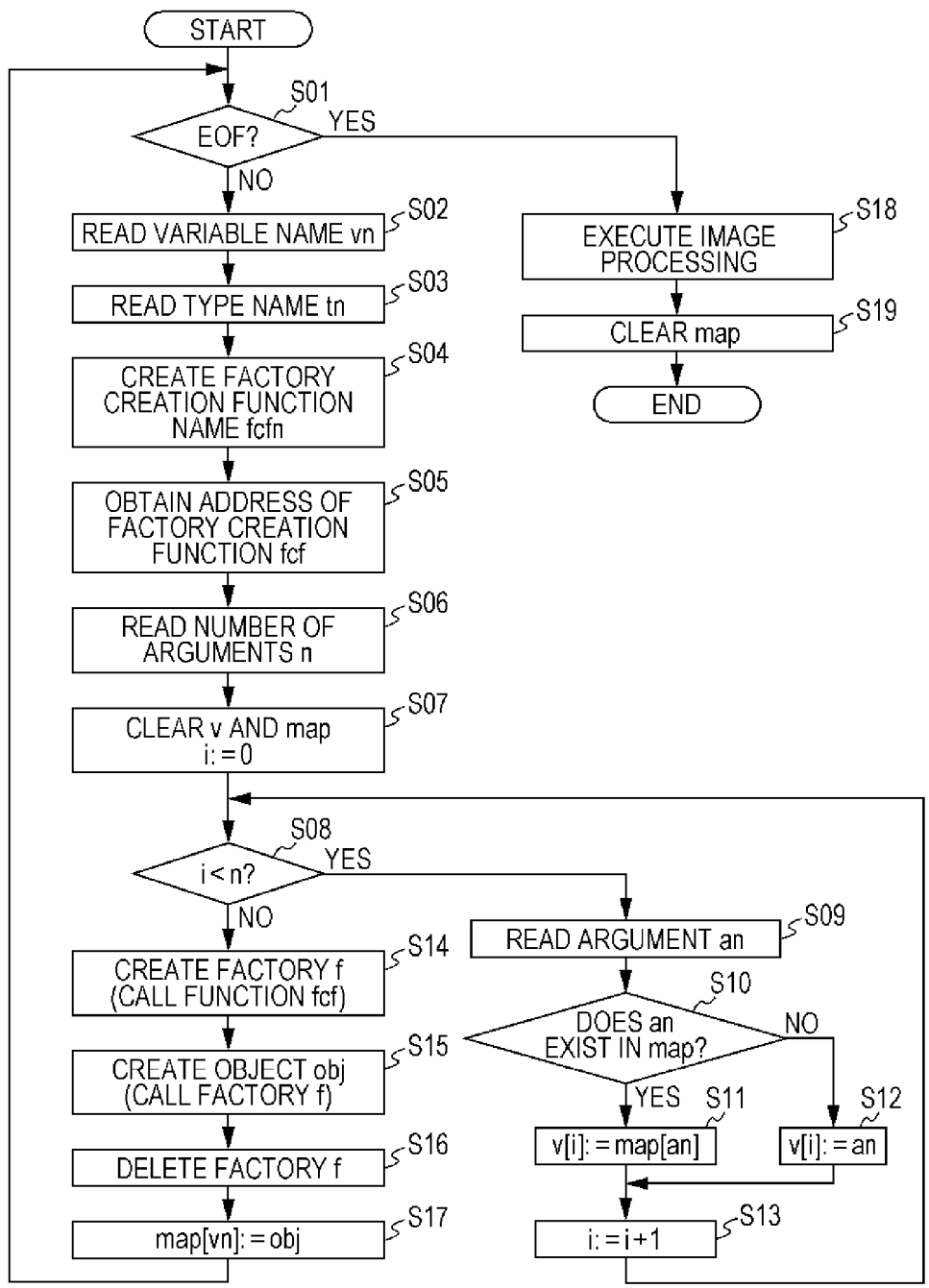
FIG. 7 is a flowchart illustrating a flow of processing that is executed by the instruction interpretation executing unit.

FIG. 7 is a flowchart illustrating the flow of processing executed by the instruction interpretation executing unit 48.

The instruction interpretation executing unit 48 reads image processing instructions (in the form of an electronic file), analyzes the instructions, and sequentially extracts (reads out) the pieces of information about the processing modules 38. Specifically, in step S01, the instruction interpretation executing unit 48 determines whether or not all the pieces of information have been read from the image processing instructions, that is, whether or not an end symbol indicating the end of the file (EOF) of the image processing instructions has been detected. If a negative determination is made in step S01, the process proceeds to step S02. In step S02, the instruction interpretation executing unit 48 reads one variable name from the image processing instructions and sets it as vn. In step S03, the instruction interpretation executing unit 48 reads the type name associated with the variable name read from the image processing instructions and sets it as tn.

Subsequently, in step S04, the instruction interpretation executing unit 48 creates a function name fcfn of the factory creation function 60 from the read type name tn in accordance with the predetermined factory creation function name creation rule. Note that a function name created in accordance with the factory creation function name creation rule is given in advance to each factory creation function 60 registered in the factory creation function library 58. In step S05, the instruction interpretation executing unit 48 calls, from a system library, a function for obtaining the address of the storage region that stores a function to which a function name is given from the function name, and obtains the address fcf of the storage region that stores the factory creation function 60 to which the foregoing created function name fcfn is given.

Subsequently, in step S06, the instruction interpretation executing unit 48 reads the number of arguments associated with the read variable name from the image processing instructions, and sets it as n. In step S07, the instruction interpretation executing unit 48 clears the data of the array v for storing an argument character string (hereinafter referred to as argument array v) and a map for storing argument objects (associative array map in which a key serves as a variable name and the value of each array element serves as a void pointer), and sets a loop counter i to zero. Here, the argument array v is an array for storing arguments described in the image processing instructions in association with the variable name vn. However, if an argument represents the variable name of an object (processing module 38), the address of the object having the variable name is stored. The associative array map is an array for storing the addresses of objects (processing modules 38) created by the module creating units 44.

In step S08, the instruction interpretation executing unit 48 determines whether or not the loop counter i is smaller than the number of arguments n. If a positive determination is made here, the process proceeds to step S09. In step S09, the instruction interpretation executing unit 48 reads one of the arguments associated with the read variable name and sets it as an.

In step S10, the instruction interpretation executing unit 48 determines whether or not the argument an exists as the key of the map array. If a positive determination is made in step S10, the argument an is the name of an already created object (processing module 38), and thus the process proceeds to step S11, where the instruction interpretation executing unit 48 stores a value map[an] in which an in map serves as a key in an argument array v[i]. On the other hand, if a negative determination is made in step S10, the argument an is not the name of an already created object (processing module 38), and thus the process proceeds to step S12, where the instruction interpretation executing unit 48 stores it as a character string an representing the argument of a newly created object in the argument array v[i]. That is, if the argument an is a value, the instruction interpretation executing unit 48 stores the argument an in the argument array v. If the argument an is not a value but is a variable name of an object (processing module 38), the instruction interpretation executing unit 48 stores the address of the object in the argument array v. In step S13, the instruction interpretation executing unit 48 increments the loop counter i by one, and the process returns to step S08. The process from step S08 to step S13 is repeated until all the arguments associated with the variable name vn have been read and stored in the argument array v[i], whereby a negative determination is made in step S08.

If a negative determination is made in step S08, the process proceeds to step S14. In step S14, the instruction interpretation executing unit 48 calls the factory creation function 60 (factory creation function name fcfn) stored in the address fcf obtained in step S05 to create the factory 70 (factory f).

In step S15, the instruction interpretation executing unit 48 passes arguments to the created factory f in a pointer form in which an argument type is indefinite (here, the initial address of the argument array v is passed), so that an object obj (processing module 38) is created. More specifically, the factory f calls the module creating unit 44 corresponding thereto, reads out individual arguments from the argument array v in accordance with an argument type, performs form conversion using a specified form conversion class 56, and passes the arguments to the module creating unit 44. Accordingly, the module creating unit 44 creates an object (processing module 38) that uses the arguments.

In step S16, the instruction interpretation executing unit 48 deletes the factory f.

In step S17, the instruction interpretation executing unit 48 registers array elements in which the address of the created object serves as a value in the associative array map, with the variable name vn serving as a key. That is, the instruction interpretation executing unit 48 stores the address of the object obj in map[vn]. After step S17, the process returns to step S01.

If a positive determination is made in step S01, the process proceeds to step s18. In step S18, the instruction interpretation executing unit 48 activates the processing management unit 46 so that image processing is executed by the image processing unit 80 that is constructed by connecting the created objects. Accordingly, image processing is executed.

In step S19, the instruction interpretation executing unit 48 clears the associative array map.

Here, the processing in steps S01 to S03, S06, and S09 corresponds to the processing performed by the instruction interpreting unit 48A, the processing in step S04 corresponds to the processing performed by the factory creation function name creating unit 48B, the processing in steps S05 and S14 corresponds to the processing performed by the function call unit 48C, the processing in steps S07 to S13, S17, and S19 corresponds to the processing performed by the argument storage processing unit 48D, and the processing of passing arguments in step S15 corresponds to the processing performed by the argument passing unit 48E. In FIG. 5, the illustration of the functional blocks corresponding to steps S16 and S18 is omitted.

Now, the processing in the above-described flowchart will be described in detail using the image processing instructions illustrated in FIG. 6 as an example. First, the individual objects identified by the variable names illustrated in FIG. 6 will be described.

An in File object operates as the support module 38B of the image processing module 38A having a variable name "read" (read object), in which "String" is specified as a type name and "/foo/bar/in.png" is specified as an argument.

The in File object is an object that provides a character string (/foo/bar/in.png) specifying a file of image data read by the read object.

An inStrm object operates as the support module 38B of the image processing module 38A having a variable name "read" (read object), in which "FileInputStream" is specified as a type name and "inFile" is specified as an argument. The argument "inFile" indicates the in File object. The inStrm object is an object that performs processing of reading data from a source file specified by the character string provided by the in File object.

A read object operates as the image processing module 38A that reads image data, in which "ReadPNG" is specified as a type name and "inStrm" is specified as an argument. The read object is an object that calls an in Strm object and that reads the data read by the in Strm object as image data of a PNG format.

A ratio object operates as the support module 38B of the image processing module 38A having a variable name "scale" (scale object), in which "Float" is specified as a type name and "1.5" is specified as an argument. The ratio object is an object that provides a scaling factor used for enlargement/reduction processing performed by the scale object, the scaling factor being provided in the form of a floating-point character string.

A scale object operates as the image processing module 38A that performs enlargement/reduction on image data, in which "Scale" is specified as a type name and "read" and "ratio" are specified as arguments. The scale object is an object that enlarges/reduces (here, enlarges) image data read by the read object in accordance with the scaling factor (here, 1.5) provided by the ratio object.

An outFile object operates as the support module 38B of the image processing module 38A having a variable name "write" (write object), in which "String" is specified as a type name and "/tmp/out.jpg" is specified as an argument. The outFile object is an object that provides a character string (/tmp/out.jpg) specifying the site on which image data is to be written by the write object.

An outStrm object operates as the support module 38B of the image processing module 38A having a variable name "write" (write object), in which "FileOutputStream" is specified as a type name and "outFile" is specified as an argument. The argument "outFile" specifies an outFile object. The outStrm object is an object that performs processing of writing data in a file specified by the character string provided by the outFile object.

A write object operates as the image processing module 38A that writes image data, in which "WriteJPEG" is specified as a type name and "scale" and "outStrm" are specified as arguments. The write object is an object that calls an outStrm object and writes image data enlarged or reduced by the scale object, which is image data in a JPEG format, in a file specified by the outFile object.

If the image processing instructions containing the details of image processing are read, the processing is performed in the following manner. First, in step S02, a character string "inFile" is read as the variable name of the initial object described in the image processing instructions, and is set as a variable name vn.

In step S03, a character string "String" associated with the variable name "inFile" is read as a type name, and is set as a type name tn.

In step S04, a character string "load_StringFactory", which is obtained by adding a prefix character string "load_" and a suffix character string "Factory" to the type name tn, is set as a factory creation function name fcfn. Here, the factory creation function name creation rule is "add a prefix character string "load_" and a suffix character string "Factory" to the type name tn".

In step S05, the address of a function having a function name is obtained from the created factory creation function name (load_StringFactory).

In step S06, the number of arguments "1" associated with the variable name "inFile" is read, and is set as the number of arguments n.

In step S07, the argument array v and the associative array map are cleared, and the loop counter i is set to zero. In step S09, a character string "/foo/bar/in.png" is read and is set as the argument an. In step S10, a negative determination is made because an array element having the argument an as a key does not exist in the associative array map. Then, in step S12, the argument an is set to an argument array v[0]. In step S13, the loop counter i is incremented.

In the in File object, the number of argument is one, so that a negative determination is made in step S08. In step S14, a factory f is created. In step S15, the in File object is created. The address of this object is stored in an array element in which the variable name in File of the map array serves as a key in step S17.

Subsequently, the above-described processing is repeated for the next object. That is, in step S02, a character string "inStrm" is read and is set as the variable name vn.

In step S03, a character string "FileInputStream" associated with the variable name "inStrm" is read as a type name and is set as the type name tn.

In step S04, a character string "load_FileInputStreamFactory", which is obtained by adding a prefix character string "load_" and a suffix character string "Factory" to the type name tn, is set as a factory creation function name fcfn.

In step S05, the address of a function having a function name is obtained from the created factory creation function name (load_FileInputStreamFactory).

In step S06, the number of arguments "1" associated with the variable name "inStrm" is read, and is set as the number of arguments n.

In step S07, the argument array v and the associative array map are cleared and the loop counter i is set to zero. In step S09, the character string "inFigle" is read and is set as the argument an. In step S10, since an array element in which the argument an (here, inFile) servers as a key exists in the associative array map (see step S17), a positive determination is made, and the value of map[inFile] (the address of the in File object) is set to the argument array v[0] in step S11. Then, in step S13, the loop counter i is incremented.

Since the number of arguments is one in the in Strm object, a negative determination is made in step S08, a factory f is created in step S14, and the in Strm object is created in step S15. The address of this object is stored in the array element in which the variable name in Strm of the map array servers as a key.

The processing for the next object is similar to that described above, and thus the description thereof is omitted. In this way, objects are sequentially created in accordance with the description of the image processing instructions.

FIG. 12B illustrates a coding example of a program (main program) that is described by simplifying a flow of processing executed in the instruction interpretation executing unit 48.

As illustrated in FIG. 12B, the library including the factory creation function 60 (the factory creation function library 58) is specified in the section denoted by reference numeral 400, and the function name of the factory creation function 60 is created in accordance with the factory creation function name creation rule in the section denoted by reference numeral 402.

Subsequently, the factory creation function library 58 is opened in the section denoted by reference numeral 404, the address of the factory creation function 60 is obtained in the section denoted by reference numeral 406, and the factory creation function 60 is called using the obtained address to create the factory 70 in the section denoted by reference numeral 408.

Furthermore, in the section denoted by reference numeral 410, arguments are read in accordance with the number of arguments and are stored in an array. Then, the module creating unit 44 is called from the factory 70 so that an object (processing module 38) is created in the section denoted by reference numeral 412. At this time, arguments (args) are passed to the module creating unit 44.

That is, in the case of executing any function, the processing modules 38 are created and the image processing unit 80 is constructed by executing the above-described main program. Even if the argument type or form of arguments is different in individual module creating units 44, an abstract argument for absorbing the difference is defined in the generic factory class 52 used as a template, and the abstract argument is concerted by the factory 70, so that the module creating unit 44 is called without a problem. Also, the function name of the factory creation function 60 for creating the factory 70 is created from a variable name extracted from the image processing instructions in accordance with the predetermined rule, and the factory creation function 60 with the function name is registered in the factory creation function library 58. Accordingly, the factory creation function 60 may be called without a problem, and it is not necessary to aware of (describe) the function name of the factory creation function 60 in the main program.

Furthermore, it is not necessary to modify the main program even in the case of newly adding a function. The image processing class of the processing module 38 to be newly added is registered in the image processing class library 36 in advance, the module creating unit 44 for creating the processing module 38 is registered, and the factory creation function 60 for creating the factory 70 that calls the module creating unit 44 is registered, so that the processing module 38 is created in a similar manner and the image processing unit 80 is constructed. Thus, it is not necessary to modify the main program, and also it is not necessary to define arguments corresponding to the individual processing modules 38 on the main program side.

However, if a configuration according to the related art of directly calling the module creating unit 44 is employed instead of the configuration of calling the module creating unit 44 via the factory 70, it is necessary in the main program to perform hard coding by defining individual arguments in accordance with the argument types and forms for the respective module creating units 44 for the respective processing modules 38 to be created, as illustrated in FIG. 12A. In such a case, the amount of hard coding of the main program increases as the number of processing modules 38 to be registered is larger. Also, in the case of adding a function, the necessity for modifying the program arises every time a function is added. Specifically, for example, regarding the description of the image processing module 38A for enlargement/reduction (scale object) illustrated in the section denoted by reference numeral 300 in FIG. 12A, it is necessary to describe readout of a scaling factor, which is an argument (denoted by reference numeral 301), conversion to a floating-point argument type (denoted by reference numeral 302), and specification of three arguments "eng", "m", and "m" (denoted by reference numeral 303). Here, "eng" is an argument representing an image processing engine, and two "m"s are horizontal and vertical scaling factors represented by a floating point. In this way, it is necessary to describe the main program by concretizing arguments for the individual image processing classes to be registered.

According to the above-described exemplary embodiment, different generic factory classes 52 are provided for individual function names (for example, if a function name defined as a method (for example, engine( ) create( ) etc.) is different, different generic factory classes 52 are defined). For example, regarding the module creating unit 44 in which plural concrete functions having the same function names, the same numbers of arguments, and different argument types are specified, the factory 70 that calls the module creating unit 44 so that one of the plural concrete functions is executed may be created. That is, the factories 70 are created so that the factories 70 and the concrete functions are in one-to-one relationship.

Figure 8:
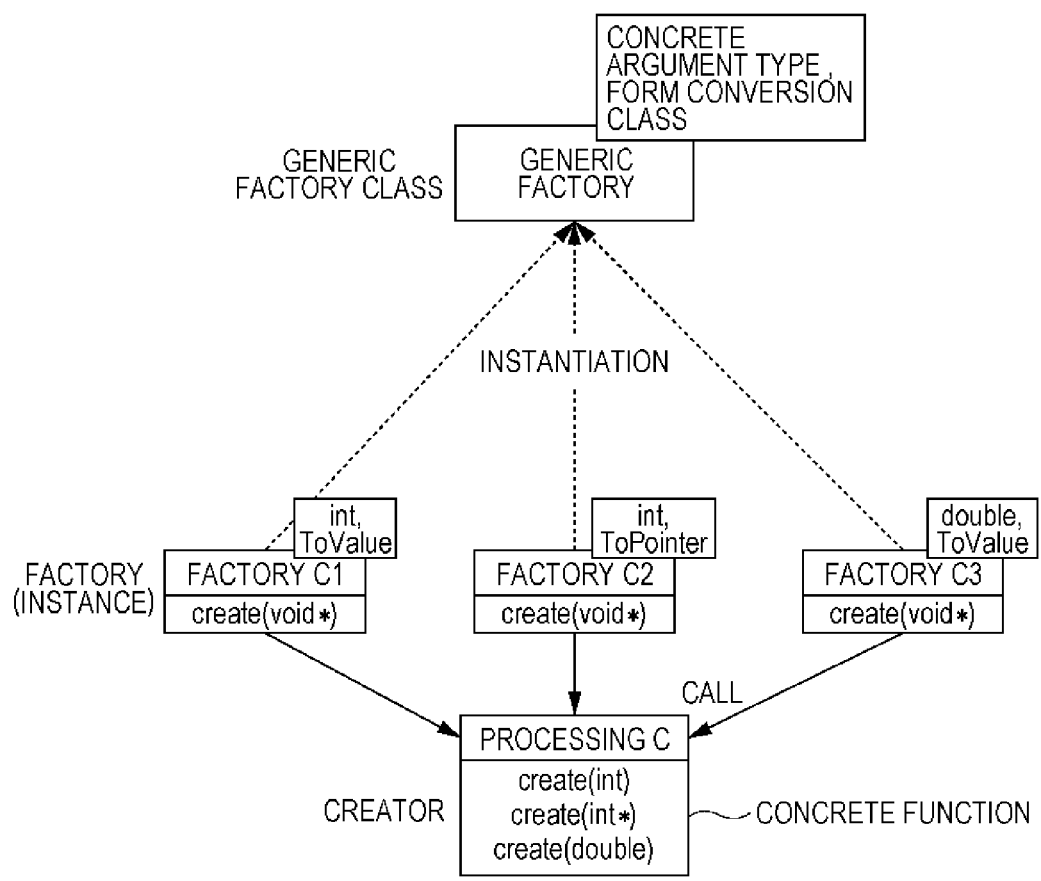
FIG. 8 is a diagram illustrating individual factories that are created in accordance with three concrete functions having the same function name, the same number of arguments, and different argument types, the concrete functions being defined in a module creating unit.

As illustrated in FIG. 8, three concrete functions are defined in the module creating unit 44 specified by processing C. The three concrete functions have the same function names and the same numbers of arguments. However, the argument types and the forms are different. The factories 70 corresponding to the respective concrete functions are created using the common generic factory class 52 as a template. A factory C1 is the factory 70 that converts an abstract argument so that the argument type becomes int and the form becomes a value. A factory C2 is the factory 70 that converts an abstract argument so that the argument type becomes int and the form becomes a pointer. A factory C3 is the factory 70 that converts an abstract argument so that the argument type becomes double and the form becomes a value.

A single generic factory class 52 may be registered regardless of the number of arguments. Alternatively, generic factory classes 52 may be prepared and registered in accordance with the number of arguments. In the above-described exemplary embodiment, the generic factory classes 52 are provided in accordance with the number of arguments. This will be further described with reference to FIG. 9.

FIG. 9A is a model diagram in a case where the number of arguments is one, FIG. 9B is a model diagram in a case where the number of arguments is two, and FIG. 9C is a model diagram in a case where the number of arguments is three. A description has been given above, with reference to FIG. 10, of a specific example (installation example) of the generic factory class 52 in a case where the number of arguments is four. In the case of creating generic factory classes 52 in accordance with the number of arguments, definition is performed in accordance with the number of arguments in declaration of a template class in the section denoted by reference numeral 100, declaration of the generic factory classes 52 is performed with a name based on the number of arguments in the section denoted by reference numeral 102, a structure is defined for the number of arrays according to the number of arguments in the section denoted by reference numeral 106, and the form conversion classes 56 are described in association with the respective arguments in the section denoted by reference numeral 118.

A user creates and registers the factory creation function 60 in advance so as to create the factory 70 by instantiating the generic factory classes 52 in accordance with the number of arguments of the module creating unit 44 to be called.

In the above-described exemplary embodiment, a description has been given of a case where one or more arguments are specified for each processing module 38. Alternatively, there may exist a processing module 38 for which an argument is not specified. An example of the processing module 38 for which an argument is not specified includes an object that performs processing of creating data using a random number or that performs processing of returning a constant. It is not necessary to pass arguments to the module creating unit 44 that creates such a processing module 38 for which an argument is not specified. Thus, the generic factory class 52 in which the number of arguments is zero (that is, the generic factory class 52 that does not include operations of concerning the argument type by making an array structure of arguments, specifying the format conversion class 56 for each argument, etc.) may be prepared to generate the factory 70.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing method, executable by a processor, comprising:
   creating, by a plurality of module creating units, when called, processing modules;
   creating, by a plurality of wrapper creating units, when called, wrappers;
   extracting, from image processing information for executing a series of image processing operations, class names of a plurality of different types of image processing classes corresponding to the individual processing modules and arguments unique to the plurality of different types of image processing classes;
   converting the extracted class names in accordance with a predetermined rule and calling the plurality of wrapper creating units to which the converted class names are given, wherein the plurality of wrapper creating units create, in response to being called, the wrappers;
   storing the extracted arguments in an array
   specifying an initial address of the array in a pointer form in which an argument type is indefinite; and
   passing the initial address to the created wrappers,
   wherein the wrappers, in response to receiving the initial address of the array in the pointer form, call the plurality of module creating units and pass the extracted arguments specified in the pointer form, in which the argument type is indefinite, to the plurality of module creating units in an argument type and a form that are usable by the plurality of module creating units,
   wherein the plurality of module creating units, in response to being called by the wrappers, create the processing modules by instantiating the plurality of different types of image processing classes using functions to which a common function name is given and to which the arguments unique to the plurality of different types of the image processing classes are specified.

2. An image processing apparatus comprising:
   a processor;
   memory storing executable instructions that, when executed by the processor, causes the processor to operate:
   a plurality of module creating units that create, when called, processing modules;
   a plurality of wrapper creating units that create, when called, wrappers;
   an extracting unit that extracts, from image processing information for executing a series of image processing operations, class names of a plurality of different types of image processing classes corresponding to the individual processing modules and arguments unique to the plurality of different types of image processing classes;
   a calling unit that converts the extracted class names in accordance with a predetermined rule and that calls the plurality of wrapper creating units to which the converted class names are given, wherein the plurality of wrapper creating units create, in response to being called, the wrappers; and
   an argument processing unit that stores the extracted arguments in an array, that specifies an initial address of the array in a pointer form in which an argument type is indefinite, and that passes the initial address to the created wrappers, wherein the wrappers, in response to receiving the initial address of the array in the pointer form, call the plurality of module creating units and pass the extracted arguments specified in the pointer form, in which the argument type is indefinite, to the plurality of module creating units in an argument type and a form that are usable by the plurality of module creating units,
   wherein the plurality of module creating units, in response to being called by the wrappers, create the processing modules by instantiating the plurality of different types of image processing classes using functions to which a common function name is given and to which the arguments unique to the plurality of different types of the image processing classes are specified.

3. The image processing apparatus according to claim 2, wherein, in each of the wrapper creating units, the argument type and the form of an argument usable in the corresponding module creating unit are defined in advance, and the respective wrapper creating unit creates, when called, the wrapper by instantiating a template class that has a function represented by the common function name in accordance with the definition.

4. The image processing apparatus according to claim 3, wherein, in the case of creating a wrapper that passes arguments to the module creating unit in which a plurality of functions that have the common function name and that are different in at least one of an argument type and a form are specified as usable functions, the wrapper creating unit creates a wrapper corresponding to one of the plurality of functions by instantiating the template class in accordance with the definition.

5. The image processing apparatus according to claim 3, wherein the template class is provided in accordance with the number of arguments to be passed to the respective module creating unit.

6. The image processing apparatus according to claim 4, wherein the template class is provided in accordance with the number of arguments to be passed to the respective module creating unit.

7. The image processing apparatus according to claim 2, wherein the memory stores further executable instructions that, when executed by the processor, causes the processor to operate:
a controller that performs control so that the series of image processing operations are executed by an image processing unit that is constructed by connecting the created processing modules.

8. The image processing apparatus according to claim 3, wherein the memory stores further executable instructions that, when executed by the processor, causes the processor to operate:
a controller that performs control so that the series of image processing operations are executed by an image processing unit that is constructed by connecting the created processing modules.

9. The image processing apparatus according to claim 4, wherein the memory stores further executable instructions that, when executed by the processor, causes the processor to operate:
a controller that performs control so that the series of image processing operations are executed by an image processing unit that is constructed by connecting the created processing modules.

10. The image processing apparatus according to claim 5, wherein the memory stores further executable instructions that, when executed by the processor, causes the processor to operate:
a controller that performs control so that the series of image processing operations are executed by an image processing unit that is constructed by connecting the created processing modules.

11. The image processing apparatus according to claim 6, wherein the memory stores further executable instructions that, when executed by the processor, causes the processor to operate:
a controller that performs control so that the series of image processing operations are executed by an image processing unit that is constructed by connecting the created processing modules.

12. A non-transitory computer-readable storage medium storing a program causing a computer to execute a process, the process comprising:
creating, by a plurality of module creating units, when called, processing modules;
creating, by a plurality of wrapper creating units, when called, wrappers;
extracting, from image processing information for executing a series of image processing operations, class names of a plurality of different types of image processing classes corresponding to the individual processing modules and arguments unique to the plurality of different types of image processing classes;
converting the extracted class names in accordance with a predetermined rule and calling the plurality of wrapper creating units to which the converted class names are given, wherein the plurality of wrapper creating units create, in response to being called, the wrappers;
storing the extracted arguments in an array
specifying an initial address of array in a pointer form in which an argument type is indefinite; and
passing the initial address to the created wrappers,
wherein the wrappers, in response to receiving the initial address of the array in the pointer form, call the plurality of module creating units and pass the extracted arguments specified in the pointer form, in which the argument type is indefinite, to the plurality of module creating units in an argument type and a form that are usable by the plurality of module creating units,
wherein the plurality of module creating units, in response to being called by the wrappers, create the processing modules by instantiating the plurality of different types of image processing classes using functions to which a common function name is given and to which the arguments unique to the plurality of different types of the image processing classes are specified.

* * * * *